Patented May 17, 1927.

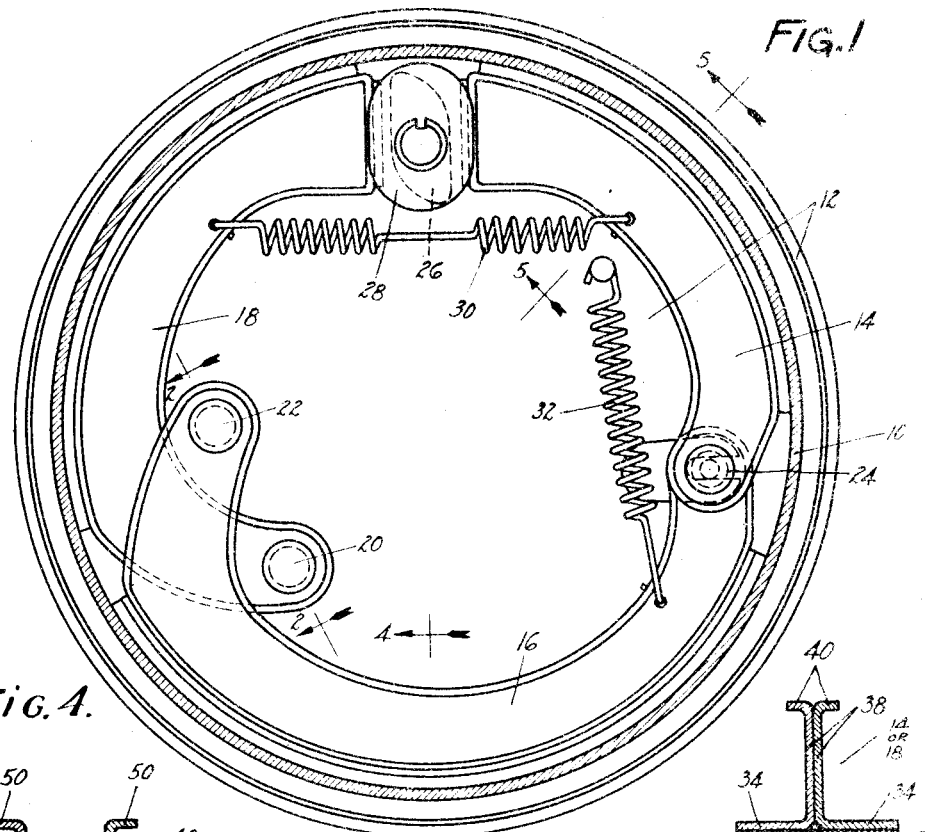

1,628,950

UNITED STATES PATENT OFFICE.

OTTO B. CLARK, OF EVANSVILLE, INDIANA, ASSIGNOR TO BENDIX BRAKE COMPANY, OF CHICAGO, ILLINOIS, A CORPORATION OF ILLINOIS.

BRAKE.

Application filed July 23, 1926. Serial No. 124,318.

This invention relates to brakes, and is illustrated as embodied in an internal expanding automobile brake. An object of the invention is to provide a brake shoe with a separate bushing at its end, preferably connecting and reinforcing a pair of spaced arms projecting beyond and within the curve of the friction part of the shoe, and with the arms and the end of the friction part defining an opening through the shoe. This is especially advantageous in a brake having the next adjacent shoe projecting at its end through the opening so defined, thus in effect overlapping the shoes.

Another feature of the invention relates to fastening the bushing in place in the shoe by peening or otherwise displacing integral parts of the bushing against the shoe.

The above and other objects and features of the invention, including various novel combinations of parts and desirable particular constructions, will be apparent from the following description of one illustrative embodiment shown in the accompanying drawings, in which:

Figure 1 is a vertical section through a brake embodying the invention, just inside the head of the drum, and showing the shoes in side elevation;

Figure 2 is a section on the line 2—2 of Figure 1, showing the bushings in the ends of two of the shoes;

Figure 3 is a view corresponding to Figure 2, but before the bushings are fastened in the shoes;

Figure 4 is a section through one of the shoes on the line 4—4 of Figure 1;

Figure 5 is a section through another shoe on the line 5—5 of Figure 1; and

Figure 6 is a view on a much larger scale of a detail of Figure 2.

The brake illustrated includes a rotatable drum 10, at the open side of which is a backing plate or the like 12, and within which are arranged three brake shoes 14, 16, and 18. Shoe 18 is anchored on a pivot 20, shoe 16 is anchored on a pivot 22, and shoe 14 is connected to shoe 16 by a pivot 24.

The brake is applied by means such as a double cam 26, shown with an end flange 28 confining laterally the free ends of shoes 14 and 18. As a matter of convenience, cam 26 is shown in "off" position, although the shoes are shown in "on" position. Cam 26 forces shoes 14 and 18 apart against the resistance of a return spring 30, to apply the brake, whereupon shoe 14 forces shoe 16 toward the drum against the resistance of an auxiliary return spring 32.

Each of the shoes 14 and 18 consists mainly of two L section stampings riveted or otherwise secured together back to back, with cylindrical flanges 34 jointly forming the friction part of the shoe and carrying the brake lining 36, and with radial flanges 38 jointly forming a stiffening web between the side edges of the shoe, and if desired strengthened by short inner flanges 40.

Shoe 16 consists mainly of two stampings having cylindrical outer flanges 42, to which is riveted or otherwise secured a friction part such as a band 44 carrying the lining 46, and having spaced-apart radial flanges 48 reinforced if desired by inner flanges 50.

As best appears in Figure 1, flanges 38 of shoe 18 project beyond and within the curve of the friction part 34 to form an anchoring arm pivoted on anchor 20, while flanges 48 of shoe 16 project beyond and within the curve of the friction part 44 to form a pair of spaced anchoring arms straddling the anchoring arm of shoe 18 and pivoted on the anchor 22. An important feature of the invention relates to providing these anchoring arms or their equivalents with separate bushings for anchors 20 and 22, which bushings also serve to strengthen the shoes.

Flanges 38 of shoe 18, as shown in Figures 2 and 3, are provided with openings surrounded by oppositely and outwardly projecting tubular bosses or flanges 54, which bosses are sleeved on a separate bushing 56. Bushing 56 has a thickened central portion 58 forming at its ends curved shoulders engaging the bases of the tubular bosses 54, and has a relatively thin integral part or flange 60 peened or otherwise displaced over the edge of each of the bosses 54 to lock the bushing permanently to the shoe.

Flanges 48 of shoe 16, which may converge slightly in the case of a relatively wide shoe such as the one shown, are also formed with alined openings, about which the metal is drawn to form oppositely and outwardly projecting tubular bosses or flanges 62 receiving a separate bushing 64 having a thickened central portion 66 forming, by its ends, oppositely-directed curved shoulders seated against the bases of the tubular bosses 62. Bushing 64 also has integral parts such as relatively thin flanges 68 peened or otherwise displaced over the edges of the tubular bosses 62 to lock the bushing permanently to the shoe.

It should be particularly noted that, in the arrangement illustrated in the drawing, bushing 64, the two spaced flanges 48, and the end of friction part 44, all cooperate to define an opening in shoe 16, through which the anchored end of shoe 18 projects, thus in effect overlapping the shoes.

While one illustrative embodiment has been described in detail, it is not my intention to limit the scope of the invention to that particular embodiment, or otherwise than by the terms of the appended claims.

I claim:

1. A brake comprising, in combination, a shoe having a cylindrical friction part and a pair of spaced arms projecting beyond and within the curve of said friction part, a separate bushing secured to said arms at their end and serving as a connection between the arms and also to receive a pivot for the shoe, and a second shoe having a part projecting through the opening defined by said arms and said bushing and by the end of the friction part.

2. A brake comprising, in combination, a shoe having a cylindrical friction part and a pair of spaced arms projecting beyond and within the curve of said friction part, a separate bushing secured to said arms at their end and serving as a connection between the arms, a pivot anchor for the shoe received in said bushing, and a second shoe having a cylindrical friction part and having an anchoring arm extending beyond and within the curve of the friction part and projecting through the opening defined by said arms and said bushing and by the end of the friction part of the first shoe.

3. A brake shoe comprising a cylindrical friction part and a pair of spaced arms projecting beyond and within the curve of the friction part, and a separate bushing connecting the ends of said spaced arms and with the arms and the end of the friction part defining an opening through the shoe.

4. A brake shoe comprising a cylindrical friction part and a pair of spaced arms projecting beyond and within the curve of the friction part and having alined openings in their ends, and a separate bushing in said openings connecting the ends of said spaced arms and with the arms and the end of the friction part defining an opening through the shoe, the bushing having integral parts displaced over the edges of said openings to hold it.

5. A brake shoe comprising a cylindrical friction part and two stiffening flanges projecting beyond and within the curve of said friction part and formed at their ends with alined openings, and a separate bushing in said openings having integral parts displaced over the edges of said openings to hold it.

6. A brake shoe comprising a cylindrical friction part and stiffening parts projecting beyond and within the curve of said friction part and formed at their ends with openings, and a separate bushing in said openings having integral parts displaced over the edges of said openings to hold it.

7. A brake shoe having two pressed metal flanges having alined openings, with the metal about each of the openings drawn out to form a projecting tubular flange, and a separate bushing in the openings having shoulders seated against the bases of said tubular flanges, and having integral parts displaced over the edges of said tubular flanges.

8. A brake shoe having two pressed metal flanges having alined openings, with the metal about each of the openings drawn out to form a tubular flange projecting away from the center of the shoe, and a separate bushing in the openings having a relatively thick central portion forming shoulders seated against the bases of said tubular flanges, and having integral parts displaced over the edges of said tubular flanges.

In testimony whereof, I have hereunto signed my name.

OTTO B. CLARK.